April 17, 1962 C. H. DEDERICK 3,030,157
ELECTRIC MOTOR BEARING LUBRICATION SYSTEM
Filed Feb. 1, 1960 2 Sheets-Sheet 1

INVENTOR:
CLINTON H. DEDERICK
BY Sutherland, Porter & Taylor
ATTORNEYS.

April 17, 1962

C. H. DEDERICK 3,030,157

ELECTRIC MOTOR BEARING LUBRICATION SYSTEM

Filed Feb. 1, 1960

INVENTOR
CLINTON H. DEDERICK
BY Sutherland, Porter & Taylor
ATTORNEYS.

United States Patent Office 3,030,157
Patented Apr. 17, 1962

3,030,157
ELECTRIC MOTOR BEARING LUBRICATION SYSTEM
Clinton H. Dederick, Brentwood, Mo., assignor to The Emerson Electric Manufacturing Company, St. Louis, Mo., a corporation of Missouri
Filed Feb. 1, 1960, Ser. No. 5,828
5 Claims. (Cl. 308—132)

This invention relates to the bearing lubrication system of electric motors.

The bearings of electric motors are commonly mounted in hubs in the end shields of the motor. While it is essential that the interior face of the bearing and the shaft which runs through the bearing be lubricated, it is also highly desirable to prevent the lubricant's getting out of the bearing assembly and into the motor windings. Accordingly, it has been customary to provide a hole extending radially through the hub and bearing, with a wick extending through the hole and into contact with the shaft. A chamber was formed in the end shield itself, around and spaced radially from the hub. This chamber, which contained the wick, also contained wool packing or felt, saturated with oil and forming a reservoir from which oil was fed by the wick, slowly but continually, to the bearing and shaft. It is also desirable, in those motors in which end play washers are used, to supply lubrication to those washers, but this was not always done satisfactorily.

At one time, an arcuate chamber, opening radially into the hub, was cored when the end shield was cast. A hole was then drilled into the chamber, to receive an oil cup, and to permit the insertion of a wick, one segment of which extended into the closed bottom of the chamber, and another segment of which projected within the hole in the hub and bearing. The remainder of the chamber was then filled with oil soaked wool packing.

More recently, the oil chamber cast into the end shields has taken the form of an axially open-ended chamber surrounding the bearing hub, the hub being supported by radially extending arms of a hub-supporting spider. The arms have been cut away axially from the inside end of the chamber, to accommodate a heavy felt "bearing washer." A radial hole is provided in the bearing hub and bearing, circumferentially intermediate two arms of the spider, and a wick, consisting of a thick strip of felt, lying axially of the hub, and with a radial projection extending into the hole in the hub and bearing and into contact with the shaft, fits beneath the annular bearing washer, is held down radially thereby, and fed with oil therefrom.

In this arrangement, the wick is placed in position and the bearing washer placed around the hub and outside of the wick, a retainer is placed axailly inboard of the bearing washer, an inner bearing cap is forced into a counterboer at the inner end of the oil chamber, and an outer bearing cap is forced into the outer opening in the oil chamber, to close the outer end. This arrangement, which is the one commonly in use, still requires an axially long and radially wide, rather complicated cored cavity in the end plate. The walls of the end plate defining the cavity are necessarily of substantial thickness, as for example, ⅛ to ¼ of an inch.

The oil chamber has in any case been provided on the outer side of the end shields.

One of the objects of this invention is to provide an electric motor bearing lubricating system which is more simple, compact, economical to manufacture and assemble, and efficient, than such systems known heretofore.

Other objects will become apparent to those skilled in the art in the light of the following description and accompanying drawing.

In accordance with this invention, generally stated, an electric motor bearing lubrication system is provided, in which a circumferentially complete oil chamber is provided by means separate from the end shields. The chamber-providing means preferably takes the form of a deep cup of relatively thin material, as compared with the thickness of the walls of the end shield. The cup, which is cylindrical, has an open mouth at one axial end, and a shaft-admitting hole in its other, "bottom" end. The cup is deep enough to contain all of the elements of the lubricating system, except the felt wick, which, extending to the shaft of the motor through a radial hole or slot opening in the hub and bearing, is seated in that hole or slot, with a tab extending axially of the hub into a lubricant sump axially outboard of the hub spider.

The cup may be drawn from stock 1/32 inch thick. Its thinness and compactness, as compared with the lubricating element containing chambers cast into the end shields heretofore, allows for more ventilating fan area.

The elements of the lubricating system of this invention contained within the cup, include a thrust washer lubricant reservoir, preferably in the form of a relatively hard felt ring, a bearing lubricant reservoir, preferably in the form of a relatively soft, axially thick felt ring, and a thrust washer bearing plate, handwiched between the two felt rings. Means, either in the form of a thrust washer wicking felt ring between the bearing washer and bearing plate, acting through openings in the thrust washer bearing plate, or in the form of a porous metal thrust washer bearing plate, are provided for supplying lubricant to the thrust washers.

In the preferred form, the bearing wick is so made and seated, that the heavy felt bearing washer may be of uniform radial thickness and axial width, so that, in assembly, no circumferential positioning of the bearing washer with respect to the wick is necessary, as contrasted with those arrangements in which a notch, to receive a part of the wick, is provided on the inner periphery of the bearing washer.

One of the cups, with its contained assembled lubrication elements, is preferably mounted on the inner side of each end shield, preferably by means of a simple coining or staking process. However, a cup on only one end shield can be used.

Since the cup is complete in itself, no lubrication system chamber is provided in the end shield casting itself, but, in the preferred embodiment, only a shallow annular groove in which a flange on the cup is seated. The bearing hub projects inwardly unsurrounded by the end shield except through a short distance at its outboard end, where it is integral with a hub spider.

In the drawing, FIGURE 1 is a sectional view, taken along the line 1—1 of FIGURE 2, showing an electric motor provided with one illustrative embodiment of bearing lubrication system of this invention;

FIGURE 3 is a sectional view taken along the line 3—3 of FIGURE 2;

FIGURE 4 is a sectional view taken along the line 4—4 of FIGURE 1; and

Figure 1:
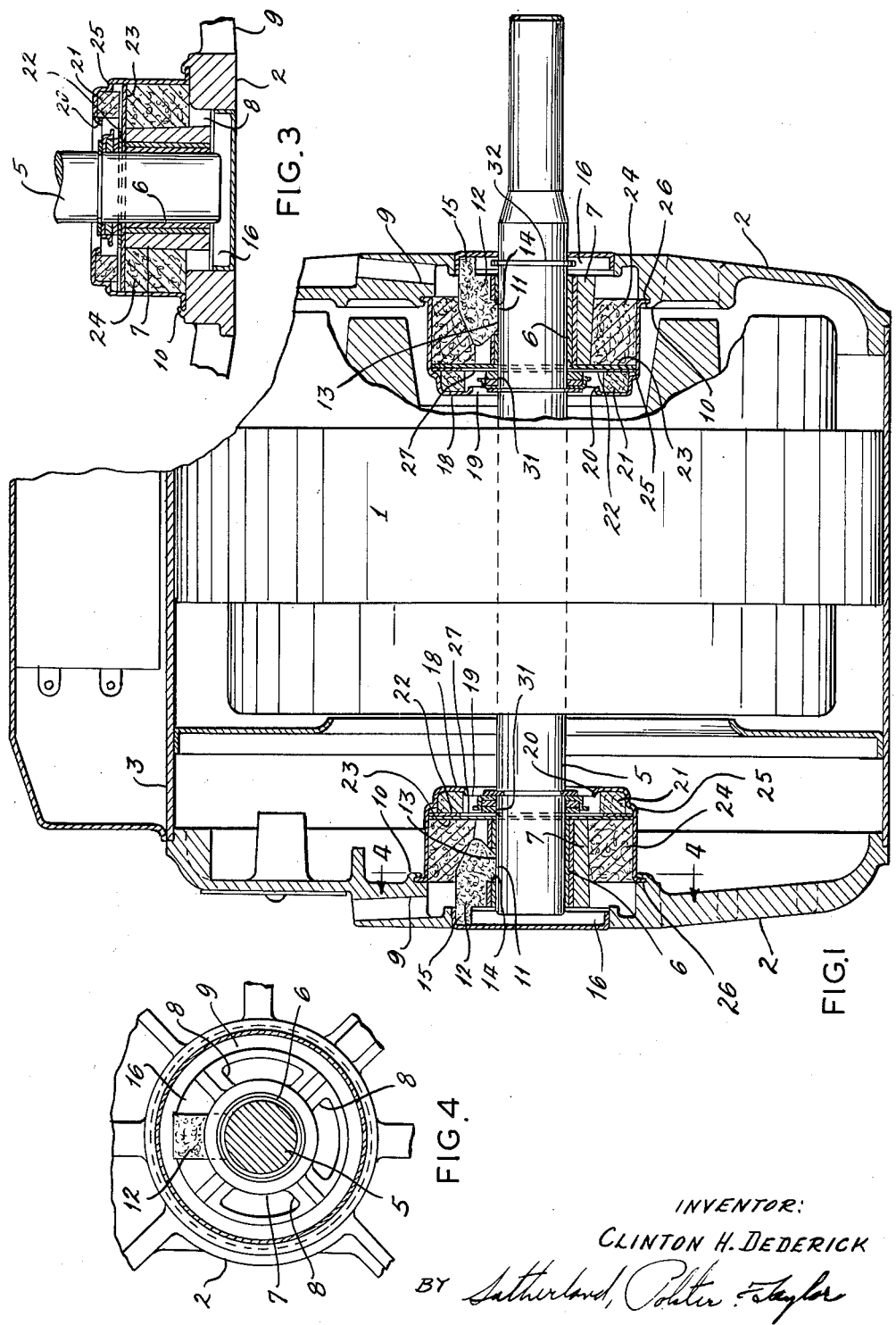
Figure 2:
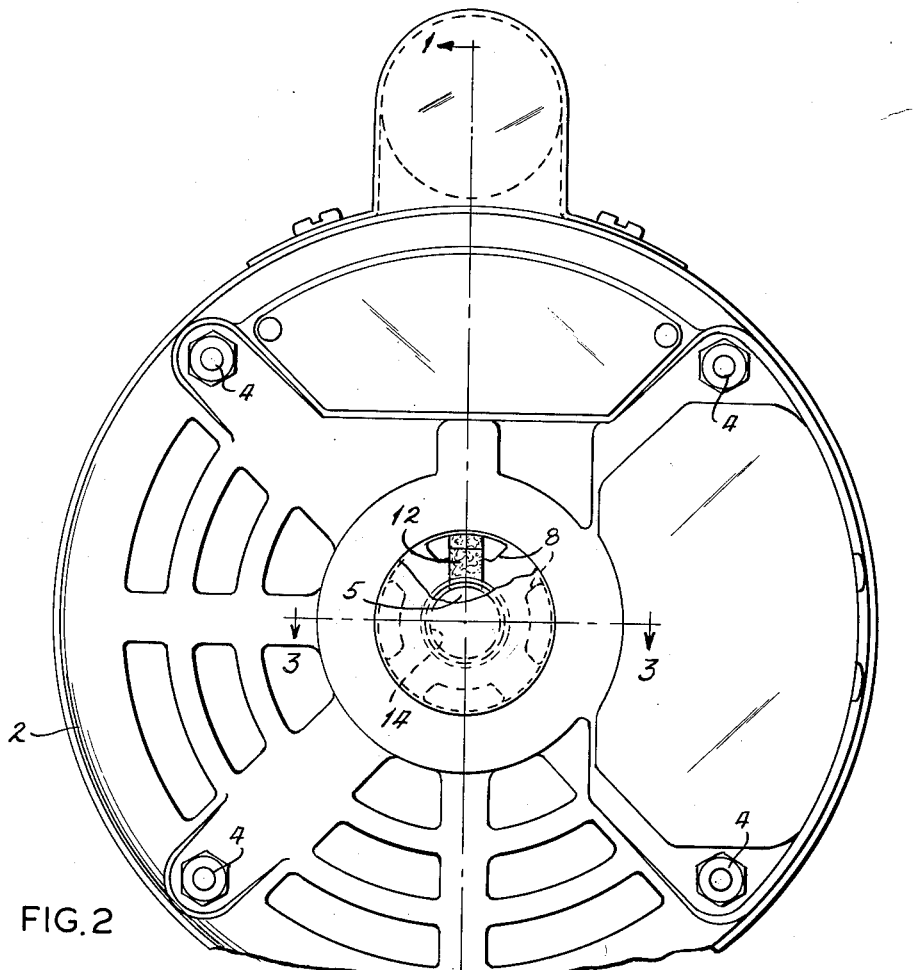
FIGURE 2 is a fragmentary view in elevation of the outside face of an end shield of the motor of FIGURE 1.
Figure 5:
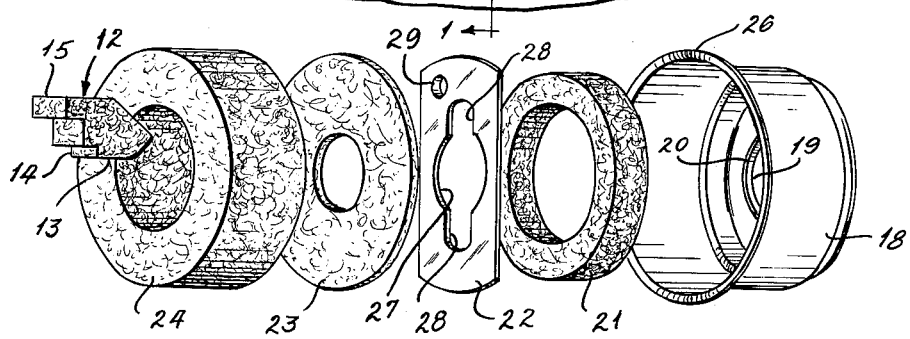
FIGURE 5 is an exploded view of a lubricating element package forming part of the lubrication system shown in FIGURE 1.

Referring now to the drawing for an illustrative embodiment of this invention, reference numeral 1 indicates a fractional horsepower, capacitor type motor, having cast end shields 2, and a frame 3, the two end shields and the frame being held in assembled relation by means of bolts 4. A shaft 5, upon which the motor rotor is mounted, is journaled in bearings 6, carried by bearing hubs 7 cast integrally with the end shield 2.

Each hub 7 is connected to the rest of the end shield 2 by arms 8 of a spider 9. Each of the arms 8 has a triangular buttress projecting inwardly to stiffen the hub.

An annular channel, the radially outer wall of which is defined by a fillet 10, is cast or machined in the end shield, concentrically with the bearing 6.

An oil wick slot 11 extends radially through the bearing hub 7 and bearing 6, and, in the hub 7, axially from the ouer end of the hub slightly past the axial center of the hub, circumferentially intermediate two arms of the spider 9. The hub part of the slot 11 can be cored from the hub when the ends shield is cast. In the embodiment shown, the axially innermost wall of the slot 11 is slanted, to form a seat for a felt bearing wick 12. The bearing wick 12 of this embodiment has a shaft-wiping lobe 13, a shoulder 14, and an axial tab 15. The axial tab 15 projects axially outwardly into an oil sump 16. The lobe 13 projects beyond the inner wall of the bearing 6, to wipe the shaft 5, and beyond the outer wall of the hub 7, to engage a felt bearing lubricant reservoir. The outwardly projecting face of the lobe 13 is sloped or beveled radially and axially inwardly. The shoulder 14, engaging the outer of the slot 11-defining edges of the bearing, serves to prevent axial shifting of the wick during the mounting of the elements of the lubrication system on the hub, as described hereinafter.

In the illustrative embodiment shown, a lubricating element package is provided consisting of a cup 18 having a hole 19 in its bottom, defined by an inturned lip 20; a thrust washer lubricant reservoir, in the form of a felt ring 21; a thrust washer bearing plate 22; a thin thrust washer wicking felt ring 23, and a bearing lubricant reservoir in the form of a felt bearing washer 24. The side wall of the cup 18, near its bottom, is stepped radially inwardly, producing an internal annular shoulder 25. The open top edge of the cup 18 is turned radially outwardly to form a flange 26.

The felt ring 21 has an inside diameter slightly greater than the diameter of the hole 19, and an outside diameter substantially the same as the inside diameter of the stepped portion of he bottom of the cup 18. The bearing plate 22 is in the form of an oblong, the short sides of which are arcs of a circle with a diameter only slightly less than the inside diameter of the cup above the shoulder 25. The bearing plate 22 has a central, shaft admitting hole 27, of a diameter to give mechanical clearance of the shaft 5. A pair of notches 28, on diametrically opposite sides of the hole 27, open into the hole 27. A small hole 29 is provided near one corner of the bearing plate, beyond the radial reach of the notch 28.

The thrust washer wicking felt ring 23 is axially thin, having the appearance of a piece of heavy flannel. Its outside diameter is substantially the same as that of the arced ends of the bearing plate 22, and its inside diameter substantially the same as that of the bearing plate shaft hole 27. The felt bearing washer 24 is axially thick, and is preferably made of a softer felt than the felt ring 21, permitting the retention of large quantities of oil. Its ouside diameter is subsantially that of the inside diameter of the cup above the shoulder 25, and its inside diameter is that of the outside diameter of the bearing hub 7, which is greater than that of the hole 27 in the thrust washer bearing plate 22.

Axially, the elements of the lubrication system package are dimensioned so that, when the cup is mounted on the end shield, as is described hereafter, one of the radial faces of the felt bearing washer 24 engages the buttresses, arms and rim of the spider, constituting a part of the inner face of the end shield and the other, the thrust washer wicking felt ring 23; the thrust washer wicking felt ring 23 engages the inner radial face of the bearing hub 7, and the bearing plate 22 is compressed firmly between the thrust washer lubricant reservoir felt ring 21 and the thrust washer wicking felt ring 23, which in turn, is backed by the felt bearing washer 24.

Since the felt ring 21 is harder than the washer 24, the pressure of ring 21 exceeds that of the opposing pressure of washer 24, so that there is a positive pressure exerted by the ring 21 on the plate 22, to press the plate, hence the wicking felt ring 23, against the inner radial face of the hub.

In assembling the lubricating system of this invention, the bearing 6 with its part of the slot 11 already formed, is pressed into the hub 7 in the usual manner, with the parts of the slot 11 aligned, and the bearing wick 12 is then seated in the wick slot 11, with the shoulder 14 against a slot-defining edge of the bearing, and the tab 15 extending into the sump 16. The thrust washer lubricant reservoir felt ring 21 is then put into the annular chamber defined by the lip 20 and the stepped-in bottom portion of the side wall of the cup. The thrust bearing washer 22 is then inserted. The felt ring 23 is placed on the bearing plate 22, and the felt bearing washer 24 is placed on the felt ring 23, all within the cup 18. The bearing washer 24 is, in this embodiment, uniformly cylindrical.

The assembled lubrication element package is then slipped, open mouth first, over the hub, and forced into place. As the bearing washer is moved axially outwardly, it rides up on the beveled surface of the wick lobe 13, forcing the lobe radially inwardly and coming into firm engagement with the outer surface of the lobe 13. When the cup 18 is in place, the outer radial face of the bearing washer 24 is compressed against the buttresses and spider arms 8, and the flange 26 of the cup 18 is seated in the annular channel around the hub, in the inside wall of the end shield. The flange 26, the outside diameter of which is slightly less than the inside diameter of the fillet 10, is both radially and axially within the compass of the fillet 10. The fillet 10 is then staked or coined over the flange 26, and the lubrication system is complete.

In assembling the motor, the stator is put in the frame 3, the rotor is placed within the stator, thrust washers 31, also called end play washers, are put on the shaft, and the two end shields are slipped over the ends of the shaft, with the shaft journaled in the bearings 6. The end shields are secured to the frame by bolts 4, a flinger 32 is put on the end of the shaft which projects beyond the end shield and positioned within the sump 16, end caps are pressed into the openings around the hub in the outer face of the end shields, and the motor assembly is complete, as far as the lubrication system is concerned. The diameter of the hole 19 in the bottom of the cup 18, is sufficiently larger han the diameter of the thrust washers comfortably to admit them, and the axial distance beween the lip 20 and the bearing plate 22 is sufficient to accommodae the thrust washers. The space between the lip 20 at the bottom of the cup 18 and the bearing plate 22 then houses the thrust washers, so that any oil thrown radially from the thrust washers, is absorbed by the felt ring 21, and returned to the thrust washer wicking felt ring 23, and felt washer 24.

In lubrication assemblies generally used heretofore, a thrust washer bearing plate has been provided, but it has been supported at its outer edges, on the side opposite the thrust washers, by a shoulder on the end shield. In the present assembly, this is not possible, but the bearing of the bearing plate against the inner radial face of the hub, and is tight sandwiching between the bearing washer 24 and felt ring 21, prevent misalignment of the bearing plate 22 as effectively as the conventional arrangement.

Numerous variations in the construction of the lubrication assembly of this invention, within the scope of the appended claims, will occur to those skilled in the art in the light of the foregoing disclosure. For example, the function of the thrust washer wicking felt ring 23 can be combined with the function of the bearing plate 21, by using a porous sintered metal bearing plate, through which oil can seep to keep the thrust washers lubricated. Somewhat different shapes of cup, bearing plate, and bearing wick can be used. The cup is generally made of steel, but can be made of other materials, such as aluminum or other metals, or plastic.

While the bearing washer, thrust washer lubricant ring and the wicks have been referred to as felt, the material of which they are made constitutes a part of this invention only to the extent that it provides the proper lubrication, and, by its dimensions and physical characteristics, the proper support for the thrust washer bearing plate. If other materials meet these requirements, they may be used without departing from this invention. The arrangement shown and described, by which the cup 18 is mounted on the end shield, is the preferred arrangement, because of its simplicity and because it provides an effective centering and sealing arrangement. If it is desired to apply sealing compound between the edge of the cup and the botttom of the annular channel into which the flange 26 extends, the channel facilitates the application of the compound and enhances its effectiveness. However, other means, such as lugs which can be staked or peened, can be used to mount the cup.

Having thus described the invention, what is claimed and desired to be secured by Letters Patent is:

1. A bearing lubrication system for an electric motor having an end shield, comprising a bearing hub connected at one end to the end shield and projecting axially inwardly, a bearing within said bearing hub, said hub and bearing having a wick-receiving seat extending radially through them, a wick seated in said seat and projecting beyond the inner wall of said bearing and outer wall of said hub, and a bearing lubricating element, mounted on said hub and fastened to said end shield, said package comprising a cup having a shaft-admitting hole in its bottom and an open mouth, a thrust washer lubricant ring, at the bottom of said cup, a thrust washer bearing plate between the mouth of the cup and the said ring, and a bearing lubricant reservoir washer between said thrust plate and said mouth, said cup being fastened at its mouth to said end shield and totally embracing said thrust washer lubricant ring, said thrust washer bearing plate and said bearing lubricant reservoir washer, circumferentially, said bearing lubricant reservoir washer embracing the free end of said hub, and said thrust washer bearing plate being tightly sandwiched between the said thrust washer lubricant ring and the said bearing lubricant reservoir washer.

2. In a bearing lubrication system for an electric motor having an end shield, a hub carried by said end shield and a wick extending radially through and projecting from said hub, the improvement comprising a formed cup, said cup having a mouth and a bottom with a shaft-admitting hole in it, and, in order from the bottom to the mouth of said cup, a thrust washer lubricant ring, a thrust washer bearing plate, and a bearing lubricant reservoir washer, means on said end shield for mounting the said cup at its mouth on said end shield and around said hub, with the bearing lubricant reservoir washer around the said hub and the thrust washer bearing plate tightly sandwiched between the said bearing lubricant reservoir washer and the thrust washer lubricant ring, all of the bearing lubricant reservoir washer, thrust washer bearing plate and thrust washer lubricant ring being circumferentially enclosed by said cup, when said cup is mounted on said end shield.

3. The improvement of claim 1 wherein the wick-receiving seat in the hub and bearing comprises a slot in said hub extending radially through the hub and axially through the outer radial face of said hub, and a radial hole in said bearing, and said wick has a shoulder engaging the outer radial hole-defining edge of the bearing, and a radially and axially inwardly beveled surface engaging the radially inner face of the bearing lubricant reservoir washer.

4. In a bearing lubrication system for an electric motor having an end shield, a hub carried by said end shield and a wick extending radially through and projecting from said hub, the improvement comprising a formed cup, said cup having a mouth and a bottom with a shaft-admitting hole in it, and, in order from the bottom to the mouth of said cup, a thrust washer lubricant ring, a thrust washer bearing plate, a thrust washer wicking ring, and a bearing lubricant reservoir washer, means on said end shield for mounting the said cup at its mouth on said end shield and around said hub, with the bearing lubricant reservoir washer around the said hub and the bearing plate and thrust washer wicking ring tightly sandwiched between the said bearing lubricant reservoir washer and the thrust washer lubricant ring, all of the bearing lubricant reservoir washer, thrust washer bearing plate, thrust washer wicking ring and thrust washer lubricant ring being circumferentially enclosed by said cup, when said cup is mounted on said end shield.

5. The improvement of claim 2 wherein the cup is provided with a radially outwardly extending flange around its mouth, and the means on the end shield for mounting the cup comprises a fillet concentric with the hub, said fillet defining the outer wall of a channel into which the said flange extends, at least a part of said fillet being peened over the said flange to anchor said flange and cup to the inside wall of said end shield.

References Cited in the file of this patent
UNITED STATES PATENTS
2,583,141    Esarey _____ Jan. 22, 1952

UNITED STATES PATENT OFFICE
CERTIFICATE OF CORRECTION

Patent No. 3,030,157                      April 17, 1962

Clinton H. Dederick

It is hereby certified that error appears in the above numbered patent requiring correction and that the said Letters Patent should read as corrected below.

Column 1, line 54, for "axailly" read -- axially --; column 2, line 25, for "handwiched" read -- sandwiched --; column 3, line 9, for "ouer" read -- outer --; line 12, for "ends" read -- end --; column 4, line 50, for "han" read -- than --; column 5, line 18, for "botttom" read -- bottom --; line 32, after "element" insert -- package --.

Signed and sealed this 21st day of August 1962.

(SEAL)
Attest:

STON G. JOHNSON
Attesting Officer

DAVID L. LADD
Commissioner of Patents